(12) United States Patent
Martinius et al.

(10) Patent No.: US 11,527,144 B2
(45) Date of Patent: Dec. 13, 2022

(54) RECOGNIZING LEFT-BEHIND OBJECTS IN A TRANSPORTATION VEHICLE

(71) Applicant: FORD GLOBAL TECHNOLOGIES, LLC, Dearborn, MI (US)

(72) Inventors: Moritz Martinius, Cologne (DE); Marcel Grein, Geilenkirchen (DE)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 124 days.

(21) Appl. No.: 17/215,150

(22) Filed: Mar. 29, 2021

(65) Prior Publication Data

US 2021/0312785 A1 Oct. 7, 2021

(30) Foreign Application Priority Data

Apr. 3, 2020 (DE) .......................... 102020109389.6

(51) Int. Cl.
  *G08B 21/24* (2006.01)
  *G01V 8/20* (2006.01)
  *G08B 5/36* (2006.01)

(52) U.S. Cl.
  CPC .............. *G08B 21/24* (2013.01); *G01V 8/20* (2013.01); *G08B 5/36* (2013.01)

(58) Field of Classification Search
  CPC ...... B60K 35/00; B60Q 1/0023; B60Q 9/008; B60R 11/04; B60R 16/00; B60R 16/02; B60W 30/09; G01V 8/20; G01S 7/4813; G01S 7/497; G01S 17/42; G01S 17/46; G01S 17/88; G01S 17/89; G02B 27/01; G08B 5/36; G08B 21/02; G08B 21/24; G08G 1/166; G08G 1/167
  USPC ........................................................ 340/691.1
  See application file for complete search history.

(56) References Cited

U.S. PATENT DOCUMENTS

| | | | |
|---|---|---|---|
| 10,289,922 B1 | 5/2019 | Wengreen et al. | |
| 2014/0364218 A1* | 12/2014 | Holmgren | A63F 9/24 463/31 |
| 2017/0167180 A1* | 6/2017 | Bingle | E05B 83/18 |
| 2017/0185952 A1* | 6/2017 | Albertus | G06Q 20/203 |
| 2018/0136318 A1* | 5/2018 | Uyeno | G01S 7/4815 |
| 2018/0186321 A1* | 7/2018 | Naghizadeh | B60R 21/01538 |
| 2019/0279487 A1 | 9/2019 | Hirose et al. | |
| 2019/0331330 A1* | 10/2019 | Chen | H04N 5/2258 |
| 2020/0224860 A1* | 7/2020 | Wei | F21V 23/04 |
| 2021/0011170 A1* | 1/2021 | Hart | G01S 17/08 |
| 2021/0112647 A1* | 4/2021 | Coleman | H05B 47/11 |

* cited by examiner

*Primary Examiner* — Stephen R Burgdorf
(74) *Attorney, Agent, or Firm* — Frank L. Lollo; MacMillan, Sobanski & Todd, LLC

(57) ABSTRACT

Apparatus for recognizing left-behind objects 2 has a sensor device 3 designed to generate sensor signals 4 upon sensing a left-behind object 2, a control unit 5 designed to receive and process the sensor signals 4 and generate control signals 6 in reaction to the processed sensor signals 4, and a warning device 7, designed to receive the control signals 6 and output a warning signal 8 in reaction to the received control signals 6. A module arrangement 13 of individual component units having pairs of LED sensors and emitters may be arranged in a vehicle 14 to scan a storage region.

5 Claims, 7 Drawing Sheets

RECOGNIZING LEFT-BEHIND OBJECTS IN A TRANSPORTATION VEHICLE

CROSS REFERENCE TO RELATED APPLICATIONS

This application claims priority to application 102020109389.6, filed in the German Patent and Trademark Office on Apr. 3, 2020, which is incorporated herein by reference in its entirety.

STATEMENT REGARDING FEDERALLY SPONSORED RESEARCH

Not Applicable.

BACKGROUND OF THE INVENTION

The invention relates to a component and a module arrangement for recognizing left-behind objects and a vehicle having such a component or such a module arrangement. In addition, the invention relates to a method for recognizing left-behind objects by means of such a component or such a module arrangement and also a computer program.

It frequently happens that vehicle users forget objects, for example, bags, pieces of clothing, keys, mobile terminals, etc., in the vehicle when leaving the vehicle used by them. This represents a problem in particular for transportation companies, for example, public transit companies, shuttle services, taxi companies, etc., since the forgotten objects have to be stored and managed in order to possibly enable a return to the vehicle user. Moreover, it can happen that forgotten objects are not found by the corresponding transportation company, since, for example other vehicle users have removed the object in the meantime or taken it for themselves. This can in turn have a negative effect on the reputation of the transportation company, since forgotten objects can no longer be given back in such cases.

In addition to inadvertently forgetting objects, intentionally leaving behind is also significant for safety reasons and is also to be prevented.

One approach for avoiding such problems is to take measures meant to prevent leaving behind objects in the utilized vehicle. One example of this is known from patent publication DE102012022318A, which discloses a method and a device for recognizing an object left behind in a vehicle which has been placed in a storage device of the vehicle. A sensor signal for detecting the object is generated by means of a sensor device and is analyzed by a control unit. If a user intentionally leaving the vehicle is sensed, an optical and/or acoustic warning is generated if a sensor signal indicates that a deposited object is present. For example, a light barrier device, a photodetector device, a pressure sensor device, an ultrasonic sensor device, or a device having microswitches can be used as the sensor device.

A similar device is known from U.S. Pat. No. 10,303,961B1, which moreover provides the option of identifying and/or classifying the left-behind objects. International publication WO2018/208315A1 also discloses a similar device, wherein the measurement principle of the sensor device is based on LiDAR (light detection and ranging). A device is described in publication WO2018/203910A1, in which a forgotten object is detected by means of an object sensor, which can be designed, for example as a light barrier, and which activates the interior lighting of the vehicle accordingly upon detection of a left-behind object.

These known methods have the disadvantage that the sensor device is arranged separately and remotely from the device generating the optical and/or acoustic warning. In particular in the case of larger means of transportation, for example buses, this can result in confusion in that a generated warning cannot directly identify a particular left-behind object in the case of multiple left-behind objects and/or the specific location of the left-behind object cannot be uniquely specified by the warning. However, this may be possible by way of complex signal processing methods, which require a correspondingly equipped control unit and therefore cause additional costs and occupy installation space. Moreover, the separate arrangement of sensor device and the device generating the warning makes retrofitting vehicles with these features more difficult.

SUMMARY OF THE INVENTION

Against this background, it is an object of the invention to recognize and handle left-behind objects while substantially avoiding the above-mentioned disadvantages. This object is achieved by the subjects of the independent claims. The dependent claims contain embodiment variants of these solutions according to the invention.

The basic concept of the invention is to arrange a sensor device, control unit, and warning device in a common component, for example in the form of a panel, in an arrangement for recognizing objects left behind in a vehicle. The sensor principle is preferably based on the detection of incident light, wherein light is emitted as the warning signal. Such a component can be integrated, for example in a baggage storage region of the vehicle, for example in the foot (floor) region, below seats, baggage compartments, etc., so that light signals in the corresponding baggage storage regions signal to the vehicle user that an object has been left behind. Leaving behind can mean inadvertent forgetting or intentional leaving behind herein.

A first aspect of the invention relates to a component for recognizing left-behind objects. The component includes a sensor device (designed to generate sensor signals upon sensing a left-behind object), a control unit (designed to receive and process the sensor signals and also generate control signals in reaction to the processed sensor signals), and a warning device (designed to receive the control signals and output a warning signal in reaction to the received control signals).

The sensor device, the control unit, and the warning device are arranged jointly in the component, for example entirely or partially enclosed by a housing, so that a compact component is formed. This has the advantage that little installation space is required and existing devices, for example vehicles, can be retrofitted with the component easily, quickly, and cost-effectively. Moreover, the component can be arranged flexibly in various regions of the vehicle due to its compactness. The integrated control makes a connection to existing control devices obsolete and the component can independently fulfill its function.

The component can advantageously help to prevent an object from being left behind, in that the user (e.g., a person who would possibly leave behind an object) is notified of the object by means of the warning signal of the warning device. The main area of application of the proposed component are vehicles, in particular public means of transportation. The invention has a particularly advantageous effect in this case, since objects are frequently forgotten in vehicles which, except for private vehicles, would otherwise have to be associated with their owner and given back in a complex procedure or possibly even represent a safety risk and require security guards to be alarmed.

The component can nonetheless also be used in combination with other devices, for example in combination with interior furnishings or seating areas of assembly rooms, theaters, railway stations, hotels, etc., e.g., at locations at which objects can be left behind. Finally, a use in private households is also possible, for example, to be able to prevent forgetting a key, a purse, a mobile telephone, etc.

The sensor device of the component is designed to generate a sensor signal and transmit it to the control unit if the sensor device detects a left-behind object. Various detection methods are usable for this purpose, wherein a light-based detection method is preferred, since such a method is implementable easily and harmlessly and moreover offers the option of linking the function of the sensor device with the function of the warning device in the form of the output of a light signal.

The control unit receives the sensor signals of the sensor device. For this purpose, control unit and sensor device are in an operational connection for signaling. The received sensor signals are subsequently processed based on instructions or a software code programmed in the control unit corresponding to one or more routines. Control signals are generated here in reaction to the processed sensor signals, which are output at the warning device as the actuator, for which purpose the warning device also has a signaling operational connection to the control unit.

The control unit can be implemented in hardware and/or software and can be physically formed in one or multiple parts.

The warning device receives the control signals and outputs a warning signal in reaction to the received control signals. The warning signal can be, for example of optical, acoustic, and/or haptic nature. An optical signal is preferred, since it can be projected specifically for the user, as compared to an acoustic signal, and moreover often is the least annoying, since a light signal as an optical signal can be integrated into existing lights with respect to the visual aspect.

In addition, the option can exist of outputting control signals to a human-machine interface, for example a display device, which shows a displayed output in reaction to the received control signals. For example, a pictogram representing the object can be displayed on a display. The user can thus advantageously also be made aware of the left-behind object by means of the human-machine interface.

According to various embodiment variants, the sensor device can include a photodetection device and/or the warning device can be designed as a light signal device.

A photodetection device can be understood as a device having an electronic component which converts light using the photoelectric effect into an electrical signal or displays an electrical resistance dependent on the incident radiation. The term light comprises both visible light and also infrared light and ultraviolet radiation. The light to be detected can, for example, originate from the ambient light or can be emitted by the warning device.

The photodetection device can be designed, for example, as a photodiode, e.g., as an electrical component which converts light into an electrical current or changes an electrical resistance in dependence on the light incidence. If the photodiode is arranged in such a way that a left-behind object changes the light incident on the photodiode, for example by reflection, absorption, or transmission, the presence of a left-behind object can be concluded by evaluating the electrical current or the resistance.

A light signal device can be understood as a device which outputs a light signal, in particular a light signal visible to humans, in dependence on a control signal.

The light-based functional principle of the sensor device and/or warning device may be practically implemented easily and cost-effectively and does not represent a hazard to the user or installation personnel. If the warning device is designed as a light signal device, there is moreover the possibility of using the light signal device as the light source for the light to be analyzed by the photodetection device after interaction with the left-behind object. For this purpose, the light signal device and the photodetection device can preferably be arranged in a common plane. For example, a panel can be equipped alternately with light signal devices and photodetection devices.

The photodetection device and/or the light signal device can preferably include light-emitting diodes.

Light-emitting diodes as the light source of the light signal device are distinguished by a low power consumption and a long service life. Moreover, an optical integration into existing lights is possible, since other light sources often also include light-emitting diodes.

Alternatively or additionally, the photodetection device can also include light-emitting diodes. Light-emitting diodes can act as photodiodes in this case. This offers the possibility of being able to use structurally equivalent light-emitting diodes for the light signal device and the photodetection device, which simplifies the production of the component and makes it cost-effective.

In one embodiment, the same light-emitting diode can be used both as a light-emitting diode of the photodetection device and also as a light-emitting diode of the light signal device, wherein the light-emitting diode can alternately be used for detection or for signal generation. In other words, a light-emitting diode which was previously used for emitting light can be used in the next step for detection, e.g., for measuring a photocurrent, or vice versa.

With multiple light-emitting diodes, the detection can therefore "travel" or "scan" over the component if the individual light-emitting diodes can be activated separately from one another in order to either emit light or measure the photocurrent which is induced by an adjacent light-emitting diode. If such a "traveling" detection is now carried out at a high sampling frequency, for example a sampling frequency of 1 kHz, objects which partially cover the surface of the component can be detected. Sampling using the photovoltaic effect can moreover take place at such a high frequency that the method is not visible to the user.

The use of the same light-emitting diode both as a light-emitting diode of the photodetection device and also as a light-emitting diode of the light signal device enables small dimensioning of the component, so that it is also usable in regions having constricted space conditions. Moreover, the production costs are reduced.

Furthermore, light-emitting diodes in the RGB colors can preferably be used, e.g., light-emitting diodes which can emit red, green, and blue light or can receive red, green, and blue light for photodetection.

In the case of the light signal device, this offers the possibility of adapting the color of the light signal or deliberately using it in a contrasting color, for example with respect to the surroundings, further light sources, etc.

If the photodetection device includes light-emitting diodes in the RGB colors, properties of the object, for example its color, can thus be detected by means of color-resolved light detection.

According to further embodiment variants, the warning device can be designed to output a signal that can be influenced by the left-behind object and is detectable by the sensor device.

Thus, for example, a light signal output by the warning device can be detected after interaction with the left-behind object by a sensor device including a photodetection device. A separate signal source for the signal to be detected by the sensor device can advantageously be omitted.

A warning device equipped with light-emitting diodes in the RGB colors for the purpose of individualizing the warning signal, as described above, can be used for the purpose of emitting light signals in different colors, which are detected by the sensor device after interacting with the left-behind object. For example, individual colors can be switched on and off in rapid chronological sequence, whereby more accurate items of information can be obtained about the left-behind object.

Furthermore, there is the possibility that the signal to be output by the warning device has a characteristic pattern. In the case of a light signal, characteristic patterns can be used to help to differentiate reflections of the left-behind object from reflections of the ambient light, i.e., for example sunlight, light of a street light, etc. Noise caused by the environment of the signal to be detected by the sensor device can thus be reduced. In this way, the left-behind object can be detected more reliably. Erroneous warning signal outputs can be avoided.

According to further embodiment variants, the component includes multiple sensor devices and/or warning devices.

For example, sensor devices and/or warning devices can be arranged adjacent to one another in pairs in rows, in particular in one plane, for example in the form of a panel.

If there are multiple sensor devices and/or warning devices, either each combination of sensor device and warning device, for example each pair made up of sensor device and warning device, can be associated with a control unit or a common control unit can be provided for all sensor devices and warning devices.

The arrangement of multiple sensor devices and/or warning devices advantageously enables a spatial coverage as needed of the region to be monitored with respect to left-behind objects. Moreover, a size of the object can be concluded with multiple sensor devices.

According to further embodiment variants, the processing of the sensor signals can comprise identifying the object.

Identification means that one or more individual properties of the object, for example shape, size, material, etc. are recognized. In other words, the identification of the object can comprise ascertaining the color and/or size of the object. A classification according to type of the object, for example key, handbag, piece of clothing, etc., is also possible.

The identification of the object is based on corresponding different sensor signals. For example, the color of the object can be ascertained in that the wavelength of the light reflected from the object and detected by the sensor device is evaluated or a wavelength-dependent sensor signal is generated.

If the sensor device is designed as a photodetection device, in particular as a light-emitting diode, the recombination of photons in the band which is characteristic for each wavelength can be used for color analysis.

The size of the object can be ascertained in that sensor signals of multiple sensor devices are evaluated. The size can result, for example from the distances of the sensor devices, whose physical variable to be detected, for example light intensity, is influenced by the object.

There is the possibility of using methods of artificial intelligence for identification, in particular for classification. For example, patterns determined by means of artificial neural networks in the sensor signals, for example a specific combination of color and shape of the object, can be recognized and these can be assigned to a class of objects.

According to various embodiment variants, the control unit can be designed to generate different control signals in dependence on the identified object. In this case, the warning device can be designed to output different warning signals in dependence on the different control signals.

For example, the warning device can output a light signal of different color and/or a different acoustic signal in dependence on color, size, type, etc. of the object.

This enables the user to obtain information about the color, size, type, etc. of the object directly.

According to various embodiment variants, the control unit can be designed to establish a trigger event, wherein the control signals are only generated if a trigger event is established.

This has the result that the warning device only receives a control signal and accordingly outputs a warning signal if a trigger event is established. Possible trigger events can be opening a door, for example of the vehicle or of the assembly room, or a change of a seat-occupancy sensor signal. The presence of a trigger event can also be established by means of a sensor device, which transmits a corresponding sensor signal to the control unit.

The linking of the output of the warning signal to the presence of a trigger event advantageously has the result that warning signals are only output if leaving behind the object is actually to be expected. Excessively frequent warning signals, which can result in confusion and nonobservance, inter alia, can thus be avoided.

A further aspect of the invention relates to a module arrangement for recognizing left-behind objects, wherein the module arrangement includes multiple modularly arranged components according to the above description.

In other words, each component can be designed in the form of a module, wherein individual modules are assembled into the module arrangement. Therefore, the advantages mentioned above with reference to the component are accordingly linked with the module arrangement. For example, a module can comprise three rows of sensor and warning devices arranged in pairs. The components of the module arrangement can advantageously be arranged in a common plane and can form, for example, a closed surface.

The module arrangement offers the possibility of equipping areas of different dimensions with the described system for recognizing left-behind objects. For example, the floor region of a foot well or of baggage storage compartments can be equipped with the module arrangement. An expansion of any already provided components is also enabled easily, quickly, and cost-effectively. Moreover, the module arrangement offers the advantage of providing a common power supply device for the individual components, so that structural space and costs can be saved.

A further aspect of the invention relates to a vehicle having a component or a module arrangement according to the above description.

The above statements for explaining the component and the module arrangement are therefore also used to describe the proposed vehicle. The advantages mentioned above with reference to the component and the module arrangement are correspondingly linked to the vehicle.

A vehicle can be understood as any mobile means of transportation, e.g., both a land vehicle and also a water or air vehicle, for example a passenger vehicle, independently of its type of drive. The vehicle can also be designed as a partially or fully autonomous vehicle. In particular, the vehicle can be a public means of transportation.

The proposed component or the proposed arrangement has a particularly advantageous effect in conjunction with a vehicle, since objects are frequently left behind in vehicles, so that there is a particularly significant need in vehicles to avoid such leaving behind.

The component or the module arrangement can preferably be arranged in a foot well or a baggage storage compartment of the vehicle, since objects are frequently left behind in these regions and the advantages of the invention therefore particularly come to bear.

A further aspect of the invention relates to a method for recognizing left-behind objects by means of a component or a module arrangement according to the above description. The method includes: generating sensor signals upon sensing of a left-behind object by means of the sensor device, receiving and processing the sensor signals by means of the control unit, generating control signals in reaction to the processed sensor signals by means of the control unit, and receiving the control signals and outputting a warning signal in reaction to the received control signals by means of the warning device.

The advantages of the proposed component and the proposed module arrangement can also be achieved by the method. All statements with respect to the proposed component and the proposed module arrangement may be transferred similarly to the method. The method can be executed in particular in a vehicle.

A further aspect of the invention relates to a computer program which comprises commands that cause a component. circuitry, or a module arrangement according to the above description to execute an above-described method.

A computer program can be understood as a program code storable on a suitable medium and/or retrievable via a suitable medium. Any medium suitable for storing software, for example a nonvolatile memory installed in a control device, a DVD, a USB stick, a flash card, or the like can be used to store the program code. The retrieval of the program code can take place, for example via the Internet or an intranet or via another suitable wireless or wired network.

The advantages of the component or the module arrangement and the method are correspondingly linked to the computer program. The statements with respect to the component or the module arrangement and the method may be transferred similarly to the computer program.

A further aspect of the invention relates to a computer-readable medium on which the computer program is stored.

DETAILED DESCRIPTION OF PREFERRED EMBODIMENTS

Figure 1:
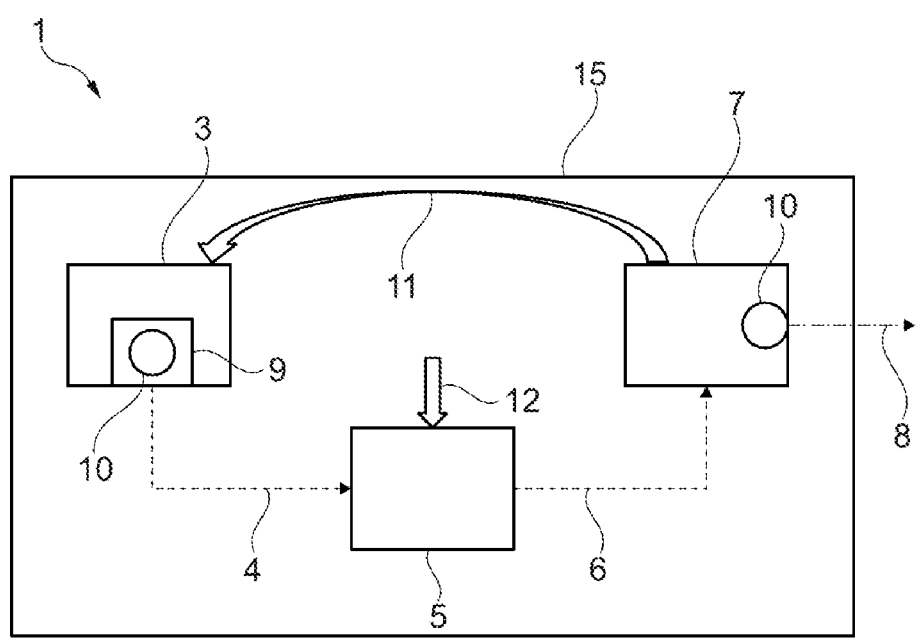
FIG. 1 is a schematic illustration of an exemplary component.
Figure 4:
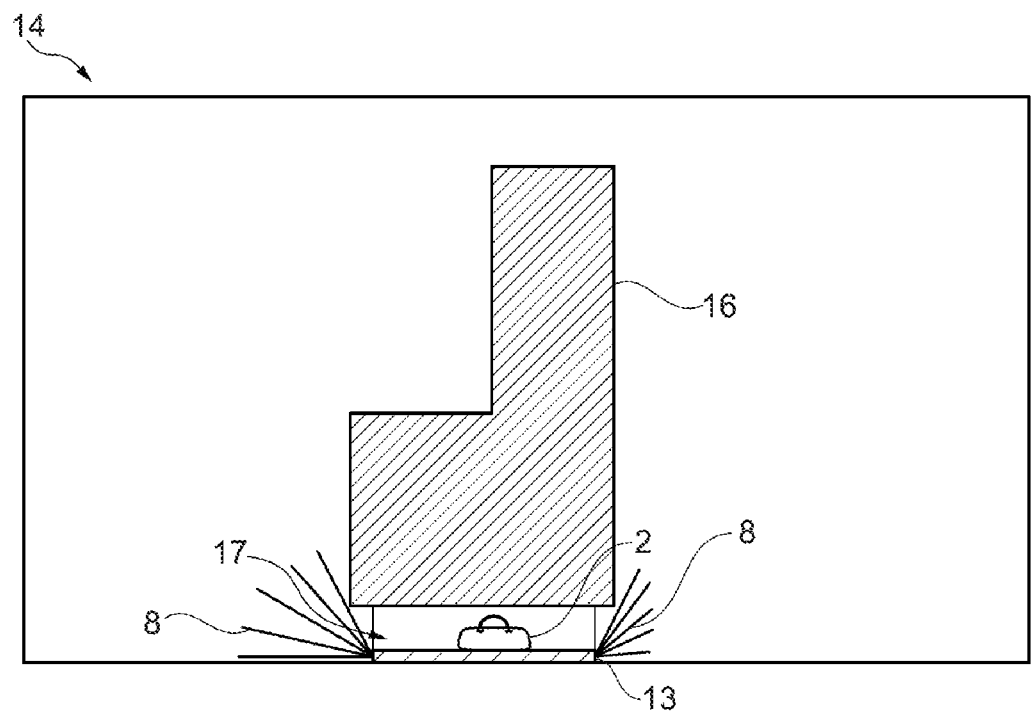
FIG. 4 shows a schematic illustration of an exemplary vehicle.

FIG. 1 schematically shows an exemplary component 1 for recognizing left-behind objects 2 (FIGS. 4 and 6). The component 1 includes a housing 15, in which a sensor device 3, a control unit 5, and a warning device 7 are arranged. The component can be installed, for example in a vehicle 14 (FIG. 4), for example in a foot well or a baggage storage compartment of the vehicle 14, in order to prevent objects 2 from being left behind in this region. For this purpose, a warning signal 8 is output as soon as a left-behind object 2 has been detected. By means of the warning signal 8, a user, for example a passenger, is notified of the left-behind object 2 and can take it with him again. In addition to the owner of the object 2, further persons can also be made aware of a left-behind object 2, so that in case of an intentionally left-behind object 2, for example security guards can be alarmed.

The sensor device 3 includes a photodetection device 9, by means of which sensor signals 4 are generated upon sensing a left-behind object 2. For this purpose, the photodetection device 9 can include light-emitting diodes 10 in the RGB colors, which act as photodiodes and by means of which received light radiation or photons can be converted into electrical signals. In that the light radiation interacted upon the presence of a left-behind object 2, the presence of the object 2 and possibly further properties of the object 2 can be concluded by analysis of the light radiation.

For example, there is the possibility of ascertaining the color of the object 2. This is because the color of the received light radiation can be ascertained by the induced generation of photons in bands characteristic for each wavelength, upon which charge carriers move from the valence band into the conduction band. Photons having higher energy can cause generation in all bandgaps of the light-emitting diodes 10, while photons of lower energy can only effectuate generation in certain bandgaps.

Utilizing this effect, the color of the reflected radiation received by the light-emitting diode 10 and thus the color of the object can be ascertained. For this purpose, the current flow of each light-emitting diode 10, e.g., each color is measured, which is dependent on the intensity of the radiation of the corresponding wavelength, which is in turn influenced by interaction with the object 2, for example by reflection on the surface of the object 2.

The control unit 5 is designed to receive and process sensor signals 4 of the sensor device 3. The result of this signal processing is the generation of control signals 6, which are output at the warning device 7. The processing of the sensor signals 4 comprises identifying the left-behind object 2, so that different control signals 6 are generated in dependence on the identified object 2.

To identify the object 2, the sensor signals 4 of the light-emitting diodes 10 are individually evaluated in the RGB colors, so that the color of the object 2 can be ascertained. Moreover, the size and shape of the object 2 can also be ascertained in that the sensor signals 4 are evaluated in a spatially resolved manner. Moreover, a pattern recognition algorithm can be implemented in the control unit 5, so that the object 2 can be classified on the basis of its color, size, and shape. For example, it can be ascertained whether the object 2 is a piece of clothing, a handbag, a set of keys, etc. The pattern recognition algorithm can be trained, for example using methods of artificial intelligence.

The control unit 5 is additionally designed to be able to establish the presence of a trigger event 12. The trigger event 12 can be, for example the opening of a door or a signal of a seat (e.g., weight) sensor which indicates vacating of the seat. The trigger event 12 is used for estimating the probability that an object 2 was left behind. For example, if the seat of a vehicle, for example a public means of transportation, is left, while the object 2 still remains in the region monitored by means of the sensor device 3, it can be presumed it is being left behind. The control unit 5 therefore checks the presence of a trigger event 12 and generates or outputs the control signal 6 only if a trigger event 12 is also present.

The control signal 6 is output at the warning device 7, which in turn outputs a warning signal 8 in reaction to the received control signal 6. The output warning signal 8 indicates that an object 2 was left behind. The warning device 7 is capable of outputting different warning signals 8 in dependence on the identified object 2, in that different warning signals 8 are output based on the different control signals 6 generated by the control unit 5 in dependence on the identity or type of identified object 2.

The warning device 7 of the exemplary embodiment can be designed as a light signal device and includes light-emitting diodes 10 in the RGB colors. A light signal can therefore be output as the warning signal 8. In addition to the function of outputting warning signals 8, the warning device 7 is also used as an active source to output an interrogation signal 11 which can be influenced by the left-behind object 2 and is detectable by the sensor device 3. This is also a light signal. In other words, the warning device 7 is used at the same time as a source of the light radiation which is detected by the sensor device 3.

In the exemplary embodiment, the warning device 8 is designed to output red, green, and blue light by means of the light-emitting diodes 10 in the RGB colors, wherein in each case only one color or any combination of the colors is omitted. Moreover, there is the possibility of providing the detectable signal 11 with a characteristic pattern (e.g., modulation). For example, the individual colors can be switched on and off in rapid chronological sequence.

Figure 2:
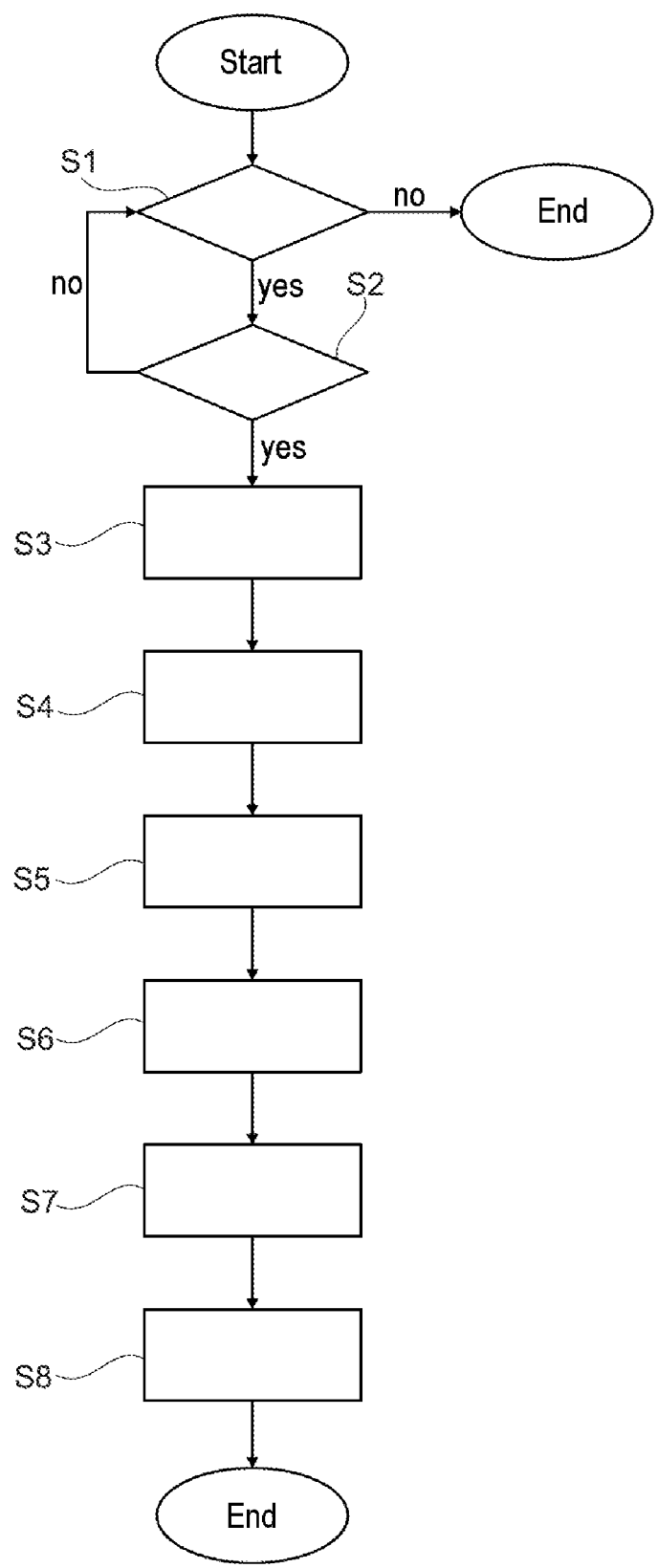
FIG. 2 is a flowchart of an exemplary method.

FIG. 2 shows a flow chart of an exemplary method. The method can be carried out, for example using the component 1 described with reference to FIG. 1.

After the start of the method, it is checked in step S1 whether a trigger event 12 is present. If no trigger event is present, the method is ended. Otherwise, the method continues to step S2.

In step S2, it is checked by means of the sensor device 3 whether a left-behind object 2 is present. For this purpose, an interrogation signal 11 which is output by the warning device 7 and is detectable by the sensor device 3, for example a light signal, can be detected after interaction with the object 2. The interrogation signal 11 can be output by the warning device continuously, at specific time intervals, or only under certain conditions, for example if the presence of a trigger event 12 was established in step S1.

If no left-behind object is detected, the method goes back to step S1. Otherwise, the method continues to step S3. Corresponding sensor signals 4 are generated in step S3.

In following step S4, the sensor signals 4 are received by the control unit 5 and processed in step S5. The processing can comprise identifying the object 2. In step S6, control signals 6 are generated based on the processed sensor signals 4.

The control signals 6 are received in step S7 by the warning device 7, which outputs warning signals 8 based on the received control signals 6 in step S8. The warning signals 8 can differ from one another in dependence on the identity of the object 2. The method is thus ended.

Figure 3:
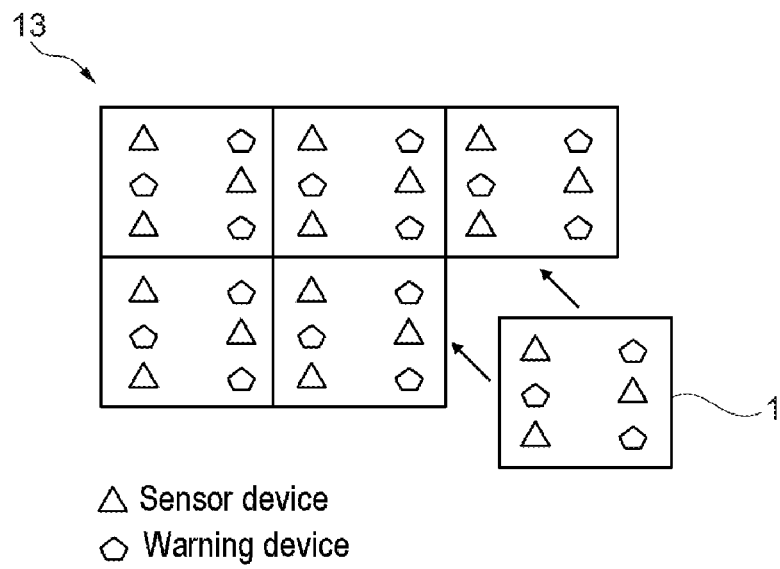
FIG. 3 shows a schematic illustration of an exemplary module arrangement.

FIG. 3 shows an exemplary module arrangement 13 in a schematic illustration in a top view. The module arrangement 13 includes multiple component units 1, a total of six component units 1 being joined as a module 13 in the illustration of FIG. 3, wherein the component units 1 are arranged modularly side-by-side in a plane in two rows and three columns to form an array of component units. Any arrangement in a differing number of rows or columns is also possible, of course. Adding further components 1 or leaving out components 1 is also possible.

Each component 1 is constructed identically and has identical dimensions. A substantially square footprint enables a flexible arrangement in rows and columns. Each component includes three sensor devices 3 and three warning (e.g., emitting) devices 7, which are each arranged side-by-side in pairs in such a way that a warning device 7 follows a sensor device 3. This enables a uniform distribution of the sensor devices 3 and the warning devices 7.

An area, for example an area in a footwell or in a baggage storage compartment, can be lined using module arrangement 13, so that this area can be monitored with regard to left-behind objects 2. By providing multiple sensor devices 3 and warning devices 7, the size and/or shape of a left-behind object 2 can advantageously be ascertained in that the sensor signals 4 of the sensor devices 3 are evaluated in consideration of their position.

FIG. 4 shows a vehicle 14 in an exemplary embodiment in a side view. The vehicle 14 can be, for example a public means of transportation, for example a bus, train, taxi, etc. and has multiple vehicle seats 16, of which one vehicle seat 16 is shown in FIG. 4. A baggage storage region 17 is located below the vehicle seat 16, in which objects 2 can be placed.

The floor of the baggage storage compartment 17 is equipped with a module arrangement 13, which can be designed, for example corresponding to the module arrangement 13 described with reference to FIG. 3. The module arrangement 13 includes multiple modularly arranged components 1, using which left-behind objects 2 can be recognized. Reference is made to the explanations with respect to FIGS. 1 and 2 for the precise functionality.

If a user rises from the vehicle seat 16 (e.g., a trigger event), this can be established by means of a seat sensor (not shown). If an object 2 was left behind in the baggage storage region 17, the warning device 7 generates projected light as a warning signal 8, which can be perceived by the user and notifies him of the left-behind object 2. The possibility exists here of generating projected light of different colors in order to make the warning signal 8 different from ambient lighting and/or to indicate the type of the object 2. For example, red light can be generated for pieces of clothing, orange light for handbags, blue light for keys, etc.

In the exemplary embodiment, the warning device 7 is arranged in such a way that broadly projected light is generated as the warning signal 8, which radiates in and around the foot region. In other words, the module arrangement 13 need not be visible upon proper use of the vehicle seat 16 since the light can be seen indirectly.

Alternatively to the embodiment shown in FIG. 4, a module arrangement 13 can additionally or alternatively be arranged in an upper baggage storage region (not shown) which is located in the roof region of the vehicle 14. In this case, in case of a left-behind object 2, indirect light can brighten the vehicle roof in this region.

The module arrangement 13 arranged in the vehicle 14 helps the vehicle passengers not to leave behind objects 2 in the vehicle 14 in that the passengers are made aware of potentially left-behind objects 2 by means of a warning signal 8. If the vehicle 14 is a public means of transportation or another vehicle 14 which is provided by a provider to other persons, for example in the context of car sharing, the effort for returning left-behind objects can be reduced. The satisfaction level of the vehicle passengers can moreover be improved.

Figure 5A:
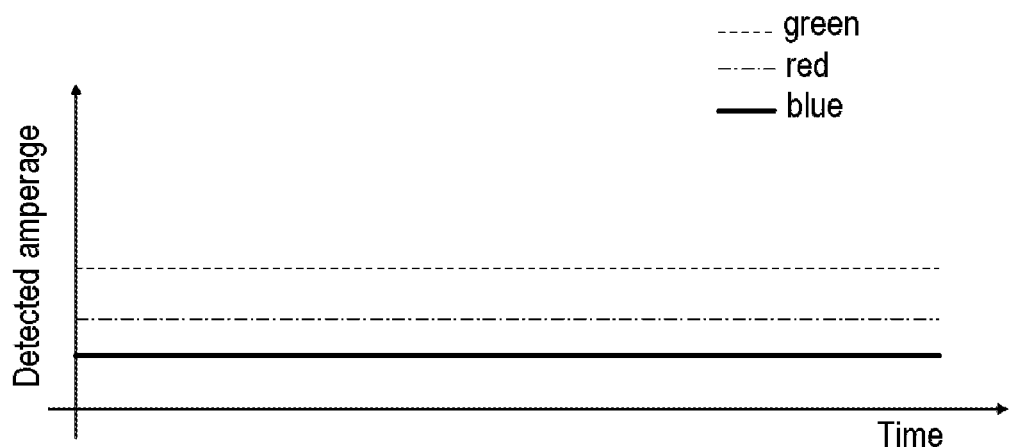
FIGS. 5*a* and 5*b* are schematic illustrations which graph the dependence of the amperage detected by means of the sensor device in relation to time.
Figure 5B:
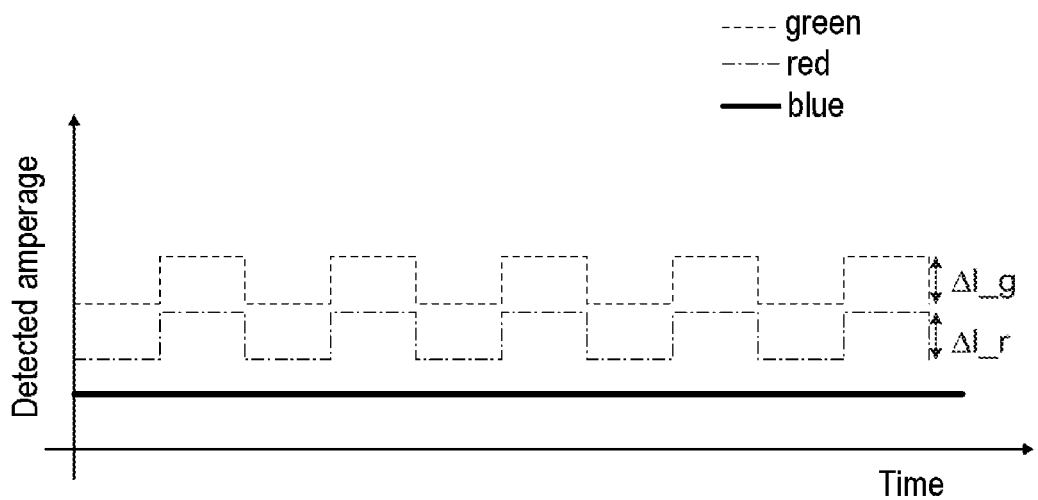

FIGS. 5a and 5b show time curves of the signal intensity (e.g., amperage) which can be sensed as the sensor signal 4 by means of the sensor device 3 for each color. The time curve which results upon detection of ambient light is shown in FIG. 5a. A constant amperage is detected over the entire observed time period.

FIG. 5b shows the amperage signal which results upon superposition of the ambient light with light of further light sources, for example light-emitting diodes of the warning device 7, which is output as the detectable interrogation signal 11. In this case, red and green light was emitted, wherein the light sources were switched on and off at regular time intervals, so that the step profile shown for the colors red and green in FIG. 5b results.

The respective amperage differences $\Delta I\_g$ and $\Delta I\_r$ are proportional to the number of detected photons, the energy of which corresponds to the respective bandgap or is higher. For example, if green light reaches the sensor device 3, which includes photodiodes for blue, green, and red light, a rise of the amperage can be observed in the photodiodes for green and red light, since the energy required for generation in the photodiode for green light is also sufficient for generation in the photodiode for red light, but not for generation in the photodiode for blue light, since its bandgap is greater than the bandgap of the photodiodes for green and red light.

Figure 6A:
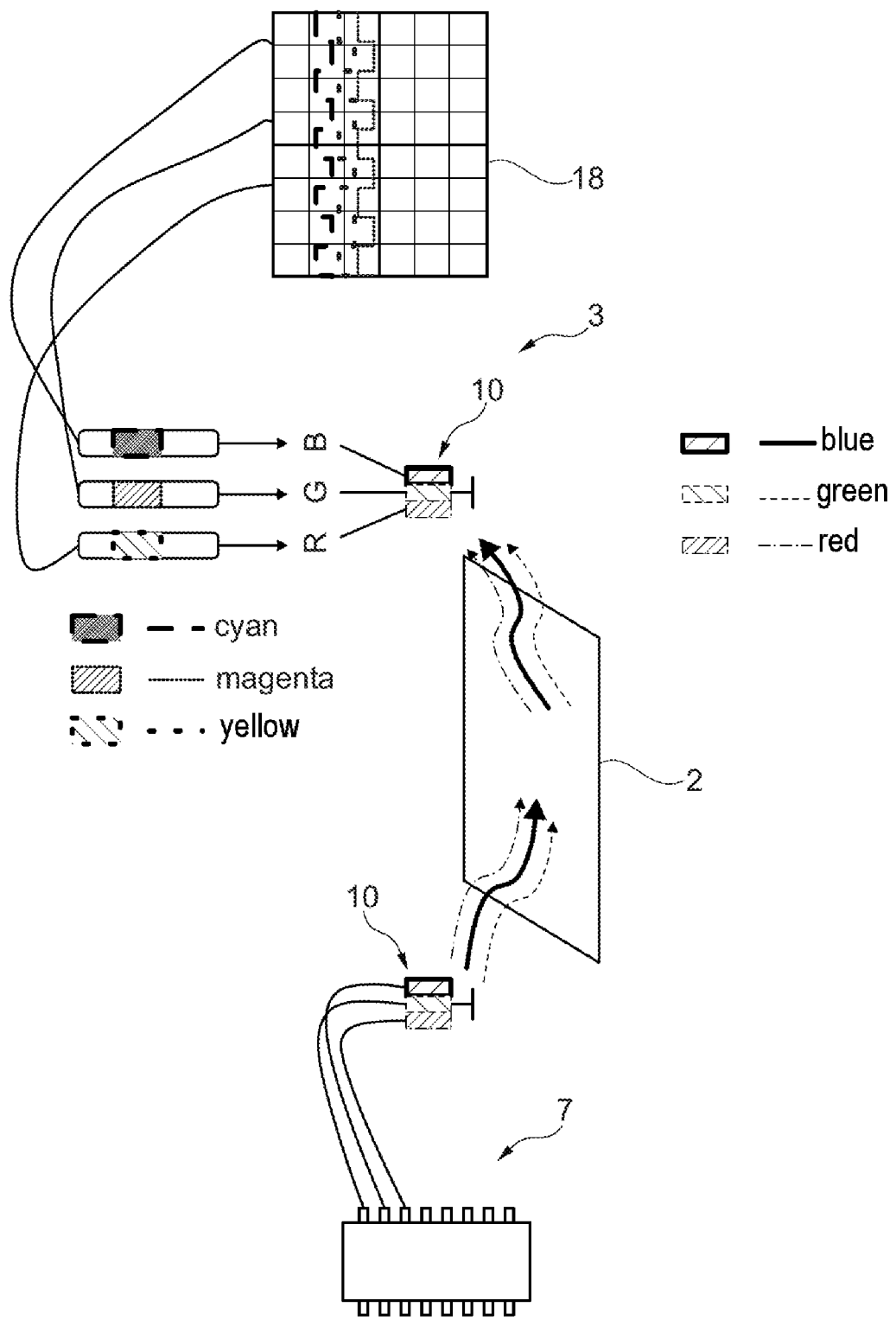
FIGS. 6*a*, 6*b*, and 6*c* show schematic illustrations of color detection in objects having surfaces of different colors.

FIG. 6a shows the color detection of an object 2 having white surface in a schematic illustration. Red, blue, and green light is emitted by the warning device 7 as the detectable signal 11 by means of light-emitting diodes 10. This light is evenly reflected from the white surface of the object 2. The reflected light is detected in a color-resolved manner by photodiodes of the sensor device 3 sensitive for red, green, and blue light, which are designed as light-emitting diodes. A uniform pattern for all colors and an increase of the amperage for all three colors are to be observed in the oscillograph 18. The white color of the surface of the object 2 can be concluded therefrom.

Figure 6B:
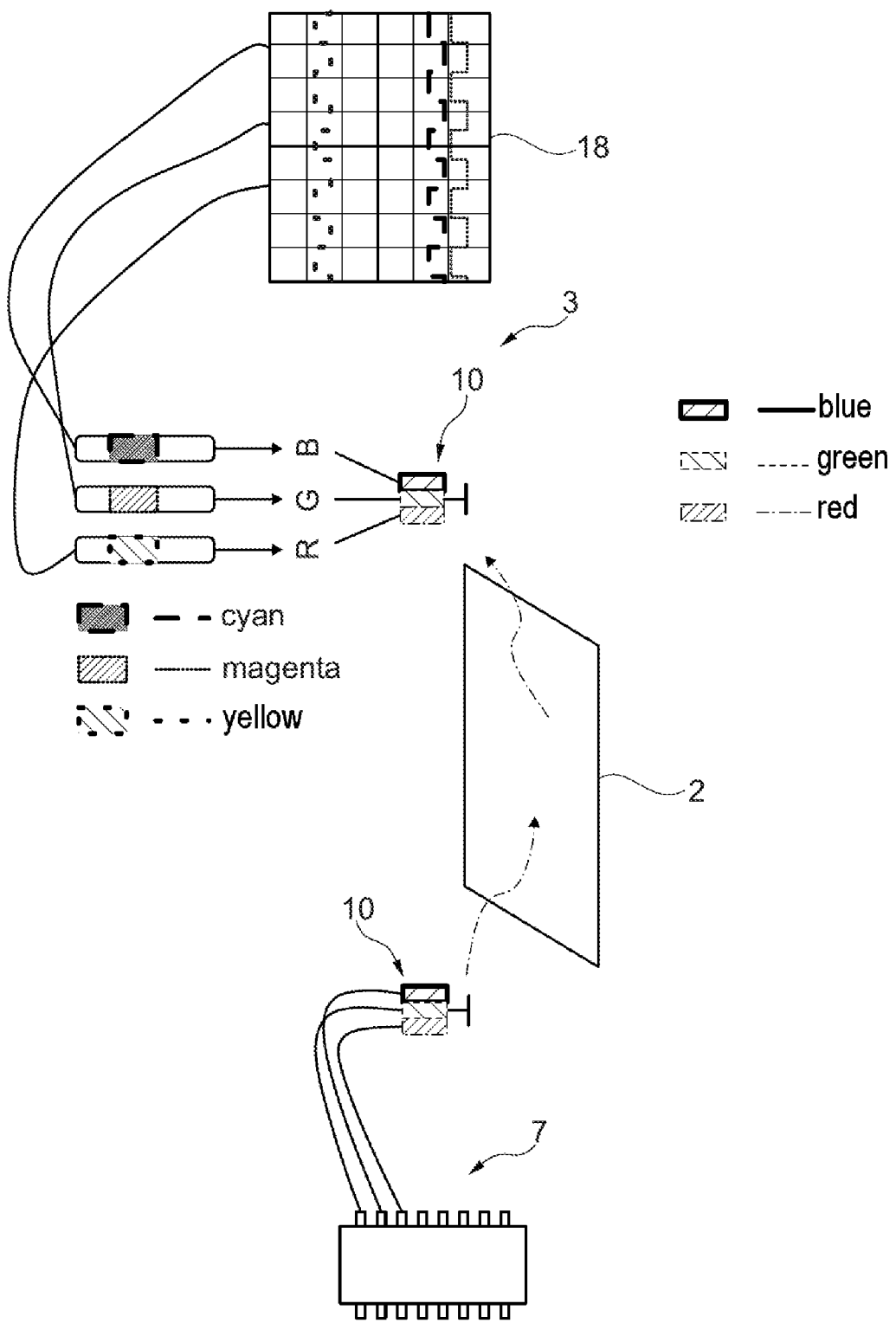

FIG. 6b shows a further color detection of an object 2 having white surface in a schematic illustration. Exclusively red light is emitted by the warning device 7 as the detectable signal 11 by means of light-emitting diodes 10. This light is reflected from the white surface of the object 2. The reflected light is detected by photodiodes of the sensor device 3 sensitive to red, green, and blue light, which are designed as light-emitting diodes, wherein an increase of the amperage is only observed in the photodiode sensitive to red light, since the energy of the red reflected light is only sufficient to skip over the bandgap of the photodiode sensitive to red light. The corresponding curve of the amperage is again recognizable in the oscillograph 18.

Figure 6C:
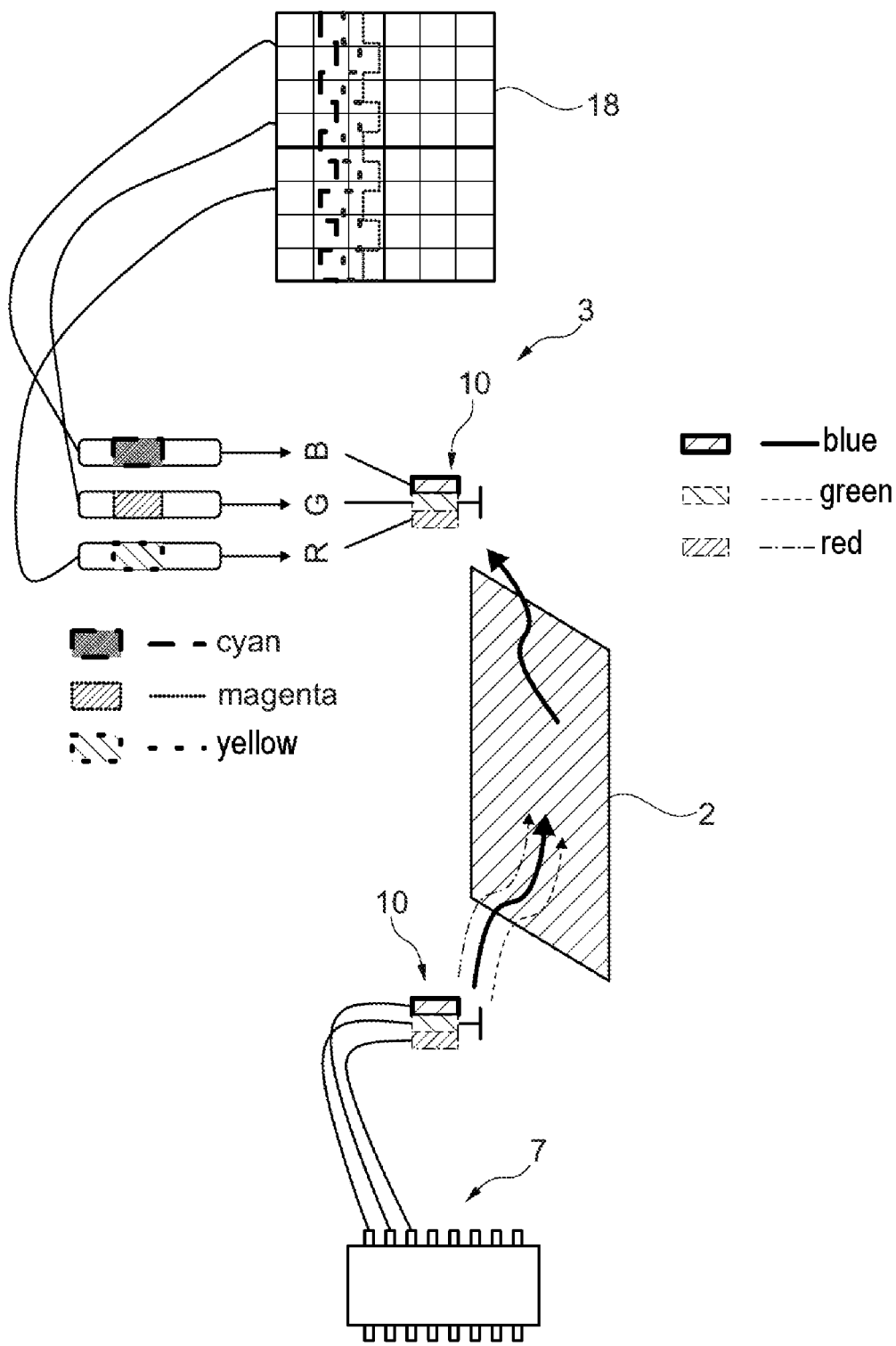

FIG. 6c shows the color detection of an object 2 having blue surface in a schematic illustration. Red, blue, and green light, i.e., white light in total, is emitted by the warning device 7 as the detectable signal 11 by means of light-emitting diodes 10. Of this light, only blue light is reflected from the blue surface of the object 2. The reflected blue light is detected by photodiodes of the sensor device 3 sensitive to red, green, and blue light, which are designed as light-emitting diodes. Only an increase of the amperage for all three photodiodes is to be observed here, since the energy of the blue reflected light is sufficient to skip over the bandgap of all three photodiodes. The corresponding curve of the amperage is again recognizable in the oscillograph 18. The blue color of the surface of the object 2 can be concluded therefrom.

What is claimed is:

1. Apparatus for recognizing a left-behind object in a vehicle, comprising:
   an array of component units arranged side-by-side, wherein each component unit comprises a plurality of side-by-side pairs of a sensor device and an emitting device, wherein the sensor devices are each comprised of a photodetection device, wherein the emitting devices are each comprised of a light emitter, wherein the photodetection devices and the light emitters are comprised of respective light-emitting diodes, wherein the light-emitting diodes are adapted to detect and emit light in RGB colors, wherein the emitting devices of the array are configured to project output signals which can be influenced by the left-behind object and return to the sensor devices of the array, and wherein the sensor devices generate sensor signals according to detection of the returned signals, wherein emitting devices of the array are configured to project the output signals using a predetermined pattern, including a variable intensity of the RGB colors; and
   a control unit coupled to receive the sensor signals and to process the sensor signals in order to generate control signals identifying the left-behind object, wherein the control signals are output to the emitting devices to project a warning signal as an indication of the presence of the left-behind object;
   wherein the control unit uses pattern recognition to determine an identity of the left-behind object, and wherein the control unit adjusts the control signals according to the determined identity of the left-behind object in order to project different warning signals corresponding to the determined identity.

2. The apparatus of claim 1, further comprising:
   a trigger sensor configured to detect a trigger event indicating a vehicle occupant exiting the vehicle;
   wherein the control unit is coupled to the trigger sensor, and wherein the control signals are only generated when a trigger event has been detected.

3. A method for recognizing a left-behind object in a vehicle, comprising the steps of:
   arranging an array of side-by-side component units at a storage region in the vehicle, wherein each component unit comprises a plurality of side-by-side pairs of a sensor device and an emitting device, wherein the sensor devices are each comprised of a photodetection device and wherein the emitting devices are each comprised of a light emitter, wherein the photodetection devices and the light emitters are comprised of respective light-emitting diodes, wherein the light-emitting diodes are adapted to detect and emit light in RGB colors;
   projecting interrogation signals from the emitting devices of the array to the storage region which can be influenced by the left-behind object, so that the interrogation signals reflect as return signals to the sensor devices of the array;

detecting the return signals with the sensor devices to generate sensor signals;

processing the sensor signals using pattern recognition to determine an identity of the left-behind object;

generating control signals identifying the left-behind object; and outputting the control signals to the emitting devices to project a warning signal as an indication of the presence of the left-behind object, wherein the emitting devices of the array are configured to project the warning signals using a predetermined pattern, including a variable intensity of the RGB colors.

4. The method of claim 3, further comprising the step of:

adjusting the control signals according to the determined identity of the left-behind object in order to project different warning signals corresponding to the determined identity.

5. The method of claim 3, further comprising the step of:

detecting a trigger event indicating a vehicle occupant exiting the vehicle;

wherein the control signals are only generated when a trigger event has been detected.

* * * * *